Sept. 21, 1965  R. E. FULTON, JR  3,207,480
AERIAL PICKUP SYSTEM
Filed Jan. 11, 1963  8 Sheets-Sheet 1

INVENTOR.
Robert E. Fulton, Jr.
BY
Michael S. Striker
ATTORNEY

Sept. 21, 1965 R. E. FULTON, JR 3,207,480
AERIAL PICKUP SYSTEM
Filed Jan. 11, 1963 8 Sheets-Sheet 2

INVENTOR.
Robert E. Fulton, Jr.
BY Michael S. Striker,
ATTORNEY

INVENTOR
Robert E. Fulton, Jr.

BY Michael S. Striker,
ATTORNEY

Sept. 21, 1965  R. E. FULTON, JR  3,207,480
AERIAL PICKUP SYSTEM
Filed Jan. 11, 1963  8 Sheets-Sheet 4

INVENTOR
ROBERT E. FULTON, JR.

BY MICHAEL S. STRIKER,
ATTORNEY

Sept. 21, 1965 R. E. FULTON, JR 3,207,480
AERIAL PICKUP SYSTEM
Filed Jan. 11, 1963 8 Sheets-Sheet 8

INVENTOR.
Robert E. Fulton, Jr.
BY Michael S. Striker,
ATTORNEY

United States Patent Office 3,207,480
Patented Sept. 21, 1965

1

3,207,480
AERIAL PICKUP SYSTEM
Robert E. Fulton, Jr., Flying Ridge, Newtown, Conn.
Filed Jan. 11, 1963, Ser. No. 250,913
19 Claims. (Cl. 258—1.2)

The present invention relates to an aerial pickup system.

More particularly, the present invention relates to an aerial pickup system for retrieving a load while it is falling through the air.

There is at the present time a considerable problem involved in the pickup of a load which is falling through the air, such as capsules which are released from rockets and the like and which it is desirable to retrieve while they are still in the air. Also, under certain circumstances it is desirable to drop a load from one aircraft to be received by another aircraft while the load is airborne.

Known systems which are used at the present time for aerial pickup suffer from several defects. Thus, they are not entirely reliable, they require an exceedingly complicated apparatus, and they require a considerable amount of skill and practice before a successful pickup can be accomplished. Moreover, great care has to be exercised when approaching the load to be picked up so as to guarantee that the danger to the load as well as to the aircraft which is attempting the pickup will be maintained at a minimum.

It is accordingly a primary object of the present invention to provide an aerial pickup system which is exceedingly simple.

The present invention provides an aerial pickup system where there is ample space between the aircraft effecting the pickup and the load which is being retrieved, thus minimizing the danger to the aircraft and the load.

A further object of the present invention is to provide an aerial pickup system wherein acceleration forces are at an absolute minimum without the use of any mechanical devices for achieving this result. With the aerial pickup system of the invention the acceleration forces are low by virtue of the inherent geometry of the system, as will be apparent from the description below.

It is also an object of the present invention to provide an aerial pickup system which does not require any particular flying skill and which will operate reliably each and every time to effect the pickup.

With the above objects in view the invention includes, in an aerial pickup method, the steps of dropping a load while a load-line extends upwardly therefrom. A lift-line is connected to the load-line while the lift-line trails from an aircraft, and once these lines are connected to each other they are brought to the aircraft so as to transfer the load thereto.

Also in accordance with the present invention there is provided an apparatus which includes an aircraft having a lift-line trailing rearwardly and laterally therefrom and connected at its outer free end to a paravane-hook assembly which maintains the lift-line extending laterally and trailing from the aircraft while the latter is in flight. This trailing lift-line is directed across and into engagement with a load-line which extends upwardly from a parachute-supported load and which is provided with a plurality of stops distributed along its length, the load-line sometimes being connected at its upper end to a drogue chute. The engagement of the lift-line with the load-line causes the load-line to be connected to the hook and thereafter the structure operates automatically to release the paravane as well as to release the drogue chute. The lift-line is paid out from the aircraft as soon as the hook is connected to the load-line and simultaneously with the paying out of the lift-line the aircraft orbits about the load-line and the part of the lift-line connected thereto. A winch is carried by the aircraft and connected to one end of the lift-line and after the lift-line is entirely paid out of the aircraft with its end only connected to the winch the aircraft flies along a substantially straight horizontal path and the winch is operated to bring the lines to the aircraft so as to transfer the load thereto. The lift-line is stored over most of its length within a container which is closed by a plug which is pulled from the container to release the line for being paid out of the container as soon as the lift-line is pulled by its connection with the load-line.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
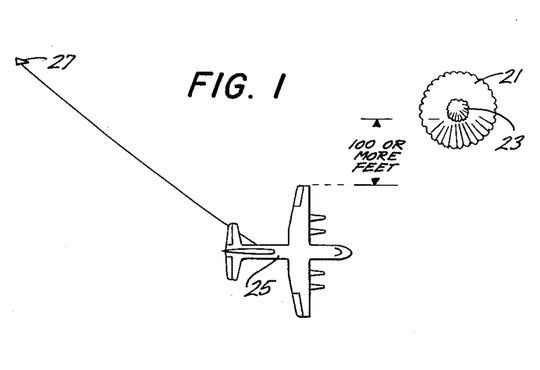
FIG. 1 is a plan view showing diagrammatically the aircraft and trailing lift-line as they approach the load which is to be retrieved.
Figure 2:
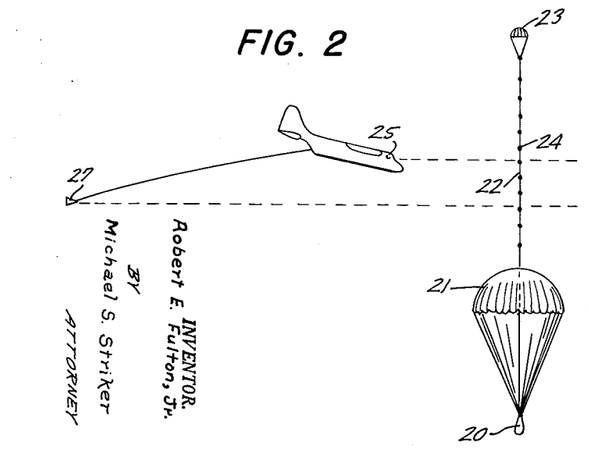
FIG. 2 diagrammatically illustrates the approach of the aircraft and lift-line to the load in elevation, FIG. 2 thus showing the same arrangement as FIG. 1 only in elevation.

The aerial pickup system of the present invention is illustrated in its more basic aspects in FIGS. 1–8. Referring to FIG. 2, it is assumed that the load 20 is falling through the air and is to be retrieved with the aerial pickup system of the invention. The load 20 is supported by a parachute 21, and attached to a load-line 22 which passes through the top end of the parachute. A drogue chute 23 considerably smaller than the parachute 21 is connected to the top end of the load-line so as to maintain the load-line in a substantially vertical position extending upwardly from the parachute-supported load. The load-line 22 has a plurality of stops 24 distributed along its length.

The pilot of the aircraft 25 when approaching the load-line 22 starts to descend at the same rate as the load-line. At this time a lift-line 26 trails from the aircraft 25. At its outer end the lift-line 26 is connected with a paravane-hook assembly 27. The paravane of this assembly maintains the lift-line 26 in its position extending laterally from the aircraft 25, and of course the forward movement of the aircraft causes the lift-line 26 to trail therefrom.

If desired more than one parachute may be provided to support the load 20. It will be noted that the paravane maintains the lift-line in a trailing position astern and to port of the aircraft as the latter approaches the line 22 while descending at the same rate as the load. The length of the trailing lift-line 26 is such that the aircraft need only come within 100 feet or more of the drogue chute. As is apparent from FIG. 2 the aircraft passes at approximately the elevation of the center of the load-line and as a result the line 26 has ample latitude for engaging the load-line 22.

The engagement of the lift-line with the load-line causes the lift-line to advance along the load line while slipping with respect thereto and in a manner described below the load-line slips into the hook of the paravane hook assembly, and the stops 24 are of such a size that the particular stop which at this time is just above the hook cannot pass downwardly through the hook and therefore becomes engaged by the hook and in this way the lift-line and load-line are connected to each other.

Figure 3:
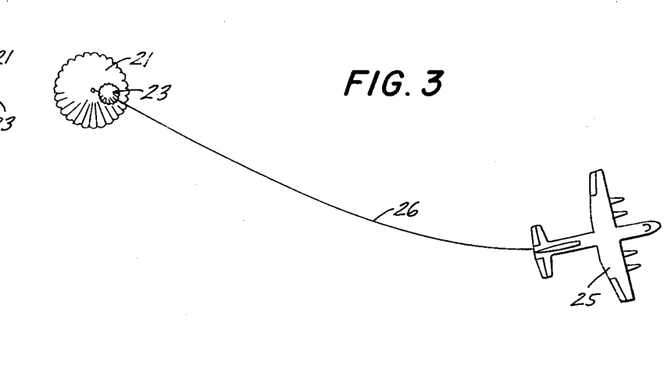
FIG. 3 is a plan view illustrating the instant when the lift-line starts to pay out of the aircraft after the lift-line has become attached to the load-line.
Figure 4:
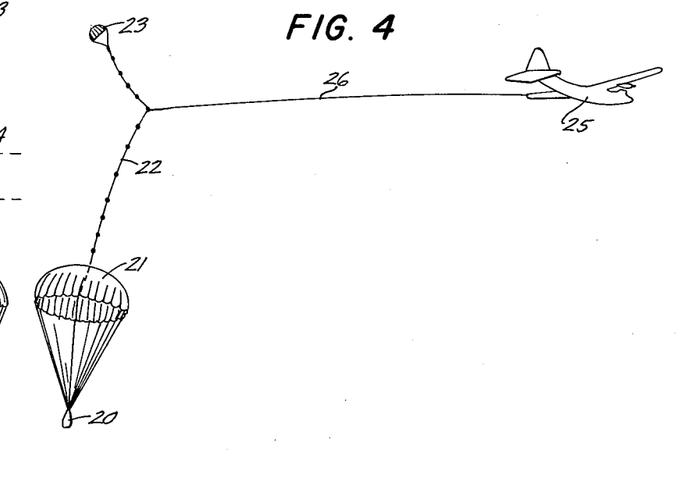
FIG. 4 shows the arrangement of FIG. 3 in elevation.
Figures 5, 6, 7, 8:
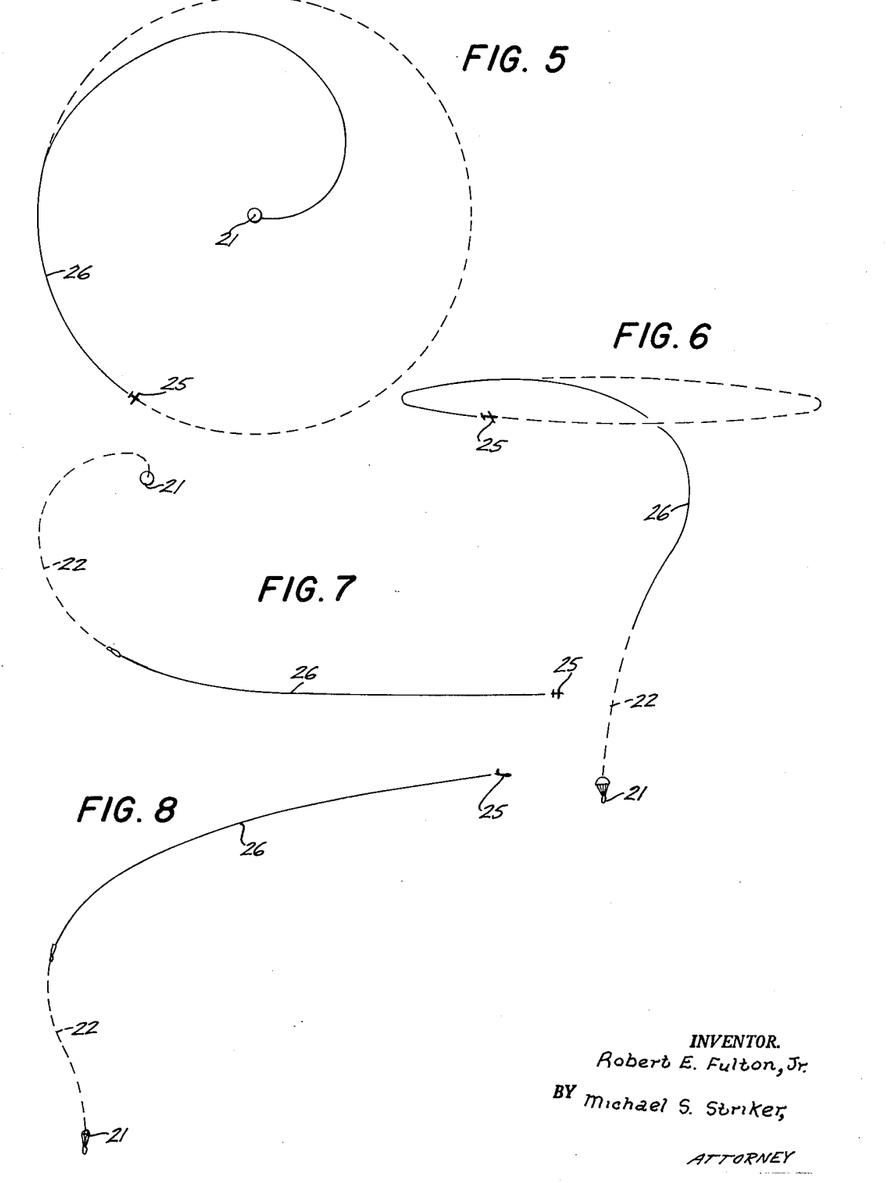
FIG. 5 is a plan view illustrating diagrammatically the aircraft orbiting while the lift-line is paying out of the aircraft after the attachment of the lift-line to the load-line in the manner shown in FIGS. 3 and 4.
FIG. 6 is an elevation of the illustration of FIG. 5, FIGS. 5 and 6 together showing the curvature of the line while the aircraft orbits and pays out the lift-line.
FIG. 7 is a diagrammatic plan view illustrating the aircraft after it has started to move along a straight horizontal path subsequent to the end of the paying out of the lift-line, FIG. 7 also illustrating how the lines are curved.
FIG. 8 is an elevation of the illustration of FIG. 7.

The manner in which the lift-line and load-line cooperate with each other just after their connection is illustrated in FIGS. 3 and 4. The connection of the lift-line to the load-line increases the tension on the lift-line, and this increase in tension will, in a manner described below, automatically cause the lift-line to pay out of the aircraft. The pilot starts circling to the left while the lift-line is paying out of the container described below, this container being carried by the aircraft, and during this interval the aircraft can either continue its descent, it can decrease its rate of descent, or it may maintain its altitude. The choice will be determined by the particular load and by experience. FIGS. 5 and 6 illustrate the aircraft orbiting about the load-line and the part of the lift-line connected thereto while the remainder of the lift-line is paying out of the aircraft. Initially there will be almost no pull on the lift-line and consequently there will be almost no pull on the load and it will continue with normal parachute descent. However, as more lift-line is dispensed it will gradually assume a combination of a parabolic and spiral configuration. This configuration is essentially parabolic in elevation, as shown in FIG. 6, and spiral in plan, as indicated in FIG. 5. During this time an increasing amount of the load will gradually be taken up by the lift-line until the parachute finally hangs limp. As the lift-line assumes the load and starts to pull the load-line through the air the parachute 21 simply streams in the air and is collapsed by the movement of the air over the parachute in a manner similar to the collapse of an umbrella. As soon as the drogue chute 23 turns down to or slightly beyond a horizontal position it is automatically released in a manner described below so that it becomes unnecessary to overcome the drag of the drogue chute.

At the end of the pay-out of the lift-line, while the aircraft is orbiting, the drag at the top of the lift-line (which is moving at the speed of the aircraft) reduces the force applied to the load-supporting parachute by the load itself and at this moment the aircraft simultaneously reduces its rate of descent and the system as a whole acts like a big, soft spring in the manner indicated in FIGS. 5–8. When the lift-line is entirely paid out the aircraft can cease turning and will start flying straight and level, and this will cause the load to slowly start rising (in a modified spiral as the turns come out of the lift-line, see FIGS. 7 and 8). The load will now gradually assume the speed and direction of the aircraft at an altitude below the aircraft, and this altitude will depend upon the drag of the line and the weight and drag of the load. An unillustrated winch which is carried by the aircraft approximately at its center of gravity operates now to reel the lift-line into the aircraft.

It will be noted from FIGS. 5–8 that as the spiral unwinds the parabolic elevation curve shown in FIG. 6 gradually moves around that shown in FIG. 8, and the line rises and rides quite high behind the aircraft, the dip occurring near the load end, as is shown most clearly in FIG. 8. The end of the lift-line distant from the load is permanently connected with the winch so that there is no transfer problem, and the load is winched aboard the aircraft while it flies in the manner indicated in FIGS. 7 and 8. Inasmuch as at the time the load is being accelerated the lift-line will be essentially parallel with the longitudinal axis of the aircraft, there will be no center of gravity problem in the aircraft. Only as the reeling-in proceeds will the load hang at an increasingly steep angle and begin affecting the aircraft's vertical trim. Heavy, compact loads will hang almost vertically by the time they are 50 feet below the aircraft travelling at a speed of 150 knots. The length of lift-line may be on the order to 10,000 feet. While such a length may appear surprising, it should be remembered that in modern guided and target-seeking missile firing practice tow cables with a length of 15,000 and 20,000 feet are routine and very large banners, drones and other targets are successfully employed and pulled at very high speeds. It is apparent from the above discussion that the geometry of this system virtually eliminates all G-forces.

Figures 9, 10:
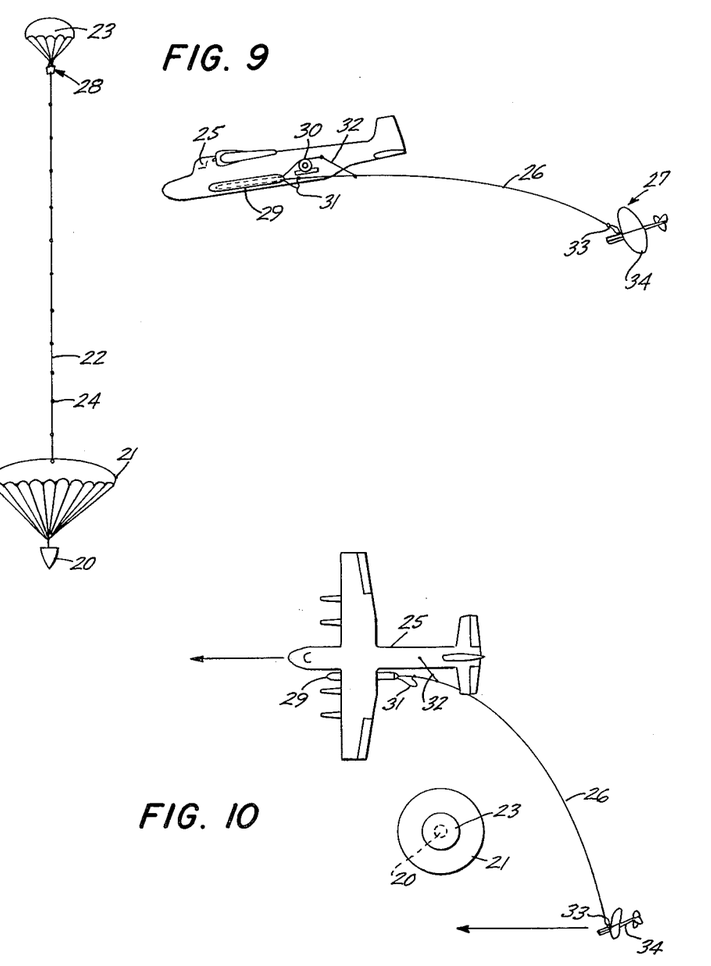
FIG. 9 is a diagrammatic illustration in elevation of the approach of the aircraft and lift-line to the load-line and the load carried thereby, FIG. 9 showing diagrammatically the various components connected to the aircraft and also showing diagrammatically the paravane-hook assembly.
FIG. 10 shows in plan the actions taking place in FIG. 9.

The structure of the invention is illustrated in somewhat more detail in FIGS. 9 and 10 which diagrammatically show the structure as the lift-line 26 approaches the load-line 22 to become connected thereto. Thus, as shown in FIG. 9 a means 28 is provided for releasably connecting the drogue chute 23 with the load-line 22, and this means 28 will operate in a manner described below to automatically disconnect the drogue chute 23 from the load-line 22 under conditions described below. As is also shown diagrammatically in FIGS. 9 and 10, the aircraft 25 carries the dispenser 29 in the form of a container in which most of the lift-line 26 is located. One end of the lift-line 26 is permanently connected with the winch 30 which is ideally located approximately at the center of gravity of the aircraft, and the lift-line extends from the winch 30 into the container 29 through the open aft end thereof, as viewed in FIGS. 9 and 10. From the container 29 the lift-line extends to the hook-paravane assembly 27. A relatively short line 31 is connected to the line 26 just beyond the container 29, and this short line 31 is connected to a plug in the open end of the container 29 so that when a pull is exerted on the line 26 by engagement thereof with the load-line 22 the line 31 will pull the plug from the container 29 so as to automatically permit the lift-line which has its extremely long length gathered into the container 29 to pay out therefrom in a fully automatic manner. A relatively weak line 32 is connected at one end to the aircraft and at its opposite end to the line 26 in the manner shown diagrammatically in FIGS. 9 and 10 so as to receive the pull of the lift-line 26 while the latter is tensioned as a result of the drag of the paravane. Upon engagement of the hook with the load-line the increase in tension will cause the relatively weak cord 32 to snap and break and thus the lift-line will now pull on the cord 31 so as to remove the plug from the open end of the container 29 and cause the lift-line to be dispensed therefrom. The paravane 34 is connected to the hook 33 in a manner described below and is automatically released from the hook 33 when the latter becomes connected to the load-line 22. The paravane 34 itself is simply a relatively small aircraft similar to a glider, and the aerofoil elements of the paravane are such that while the line 26 is dragged through the air the paravane 34 tends to move off to port and thus maintains the line 26 extending through a considerable distance to port of the aircraft 25 while the latter is in flight.

Figures 11, 12, 13:
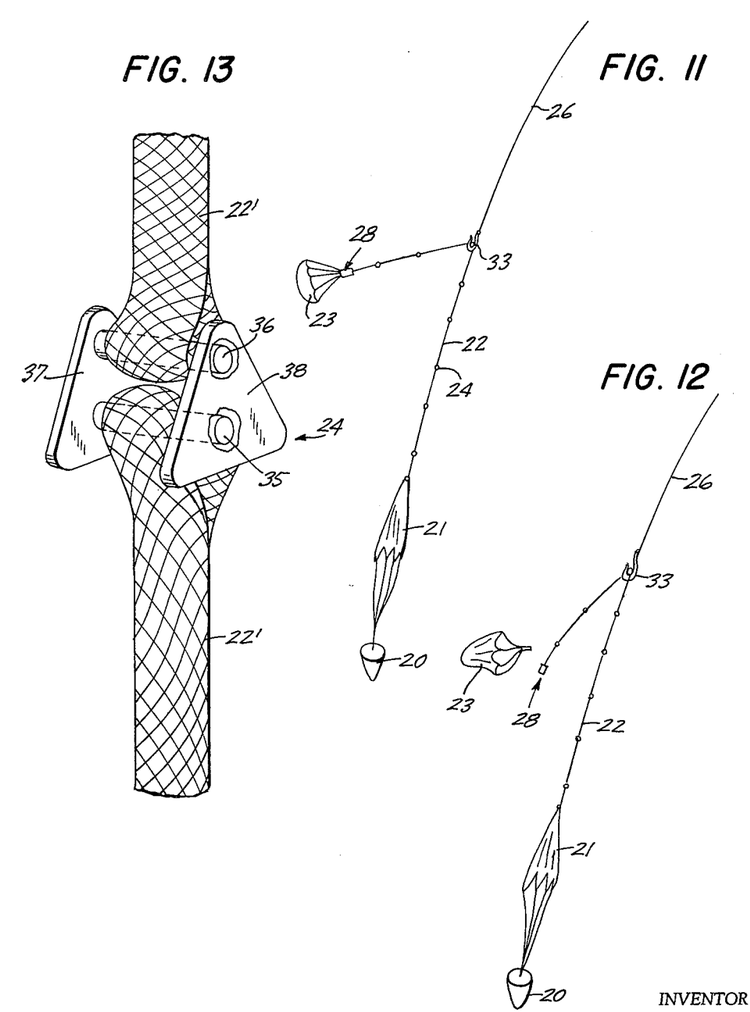
FIG. 11 illustrates the manner in which the drogue chute turns downwardly after the lift-line hooks onto the load-line.
FIG. 12 illustrates diagrammatically the release of the drogue chute from the load-line subsequent to the downward movement of the drogue chute.
FIG. 13 shows on an enlarged scale one of the several stops distributed along the load-line, the load-line itself being fragmentarily illustrated in FIG. 13.

Referring to FIGS. 4, 11 and 12, when the lift-line 26 is connected by the hook 33 with the load-line 22 and starts to pull on the latter the part of the load-line 22 above the hook 33 will turn down as is apparent from FIGS. 4, 11 and 12. The parachute 21 at the same time will collapse as the air streams over the parachute 21, and the parachute 21 is shown in this position in FIGS. 11 and 12. The device 28 operates automatically as soon as the drogue chute 23 remains for a predetermined period of time in a position which is even slightly inverted as indicated in FIG. 11 to automatically release the drogue chute so as to remove the drag of the drogue chute, and FIG. 12 shows the drogue chute just after it has been released by the device 28.

Referring to FIG. 13, it will be seen that the load-line 22 is made up of a plurality of sections 22'. The sections are respectively fixed at their adjacent ends to a pair of bars 35 and 36 which form part of each stop 24. The stop 24 includes in addition to the bars 35 and 36 the triangular plates 37 and 38, although it is to be understood that FIG. 13 shows only a preferred construction of a stop 24 and many other constructions are of course possible. The bars 35 and 36 may, for example, be welded to the plates 37 and 38, or the bars 35 and 36 may be in the form of hollow tubes and may have their free ends spread against the exterior faces of the plates 37 and 38 through which the tubes 35 and 36 extend with a press fit, for example. The load-line 22 as well as the lift-line 26 may be made in any desired way, although it is preferred to make these lines of hollow braided nylon, and as indicated in FIG. 13 the ends of the sections 22' extend around the bars 35 and 36 and are joined back to themselves in a very secure manner so as to guarantee that the load-line will not break.

Figure 14:
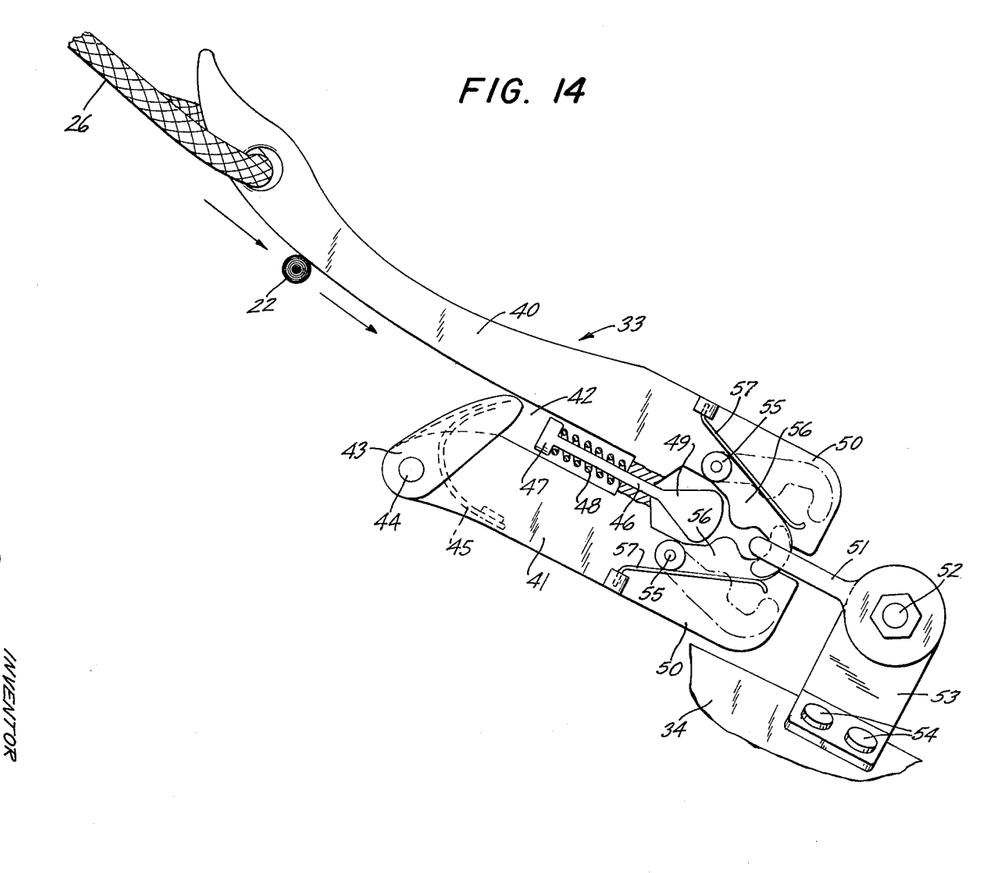
FIG. 14 shows in detail the hook which is connected to the end of the lift-line as well as the manner in which the hook is connected to the paravane and the structure for automatically releasing the paravane from the hook when the hook becomes connected to the load-line.

Referring to FIG. 14 it will be seen that the hook 33 has an elongated arm 40 formed at its left free end, as viewed in FIG. 14, with an opening through which the lift-line 26 passes so as to be securely connected to the hook 33 in the manner illustrated in FIG. 14, and the hook 33 includes a second elongated arm 41 spaced from and rigidly fixed with the arm 40 to define therewith the space 42 which receives the line 22. When the lift-line 26 engages the load-line 22 and the aircraft continues to travel the lines move with respect to each other in the manner indicated in FIG. 14 until the load-line moves into the space 42. Pivotally connected at 44 to the free end of the arm 41 is a latch 43 in the form of a hollow member having a pair of walls receiving the free end of the arm 41, and this arm carries the pivot pin 44 which extends into the opposed side walls of the latch 43. The arm 41 itself has a pair of opposed walls which slidably engage the inner faces of the opposed walls of the latch 43, and between these opposed walls of the arm 41 is located leaf spring 45 which is fixed at one end to the arm 41 and which has its free end pressing against the latch 43 so as to urge the latter in a counterclockwise direction, as viewed in FIG. 14. The length of the latch member 43 is such that it cannot turn in a counterclockwise direction, as viewed in FIG. 14, beyond the position as shown in FIG. 14, so that while the load-line 22 can move past the latch 43 into the space 42, once the load-line 22 is located in the space 42 the latch 43 snaps back to the position as shown in FIG. 14 and prevents the load-line from leaving the hook 33. Of course, the stops 24 are larger than the space 42 so that one of these stops engages the hook and further slipping of the load-line 22 with respect to the hook is reliably prevented by the stops.

Once the lift-line and load-line are connected to each other it is unnecessary to carry the paravane 34, and therefore the hook 33 is provided with a structure which will automatically release the paravane once the hook 33 is connected with the load-line 22. This automatic release structure is also shown in FIG. 14. Thus, the hook 33 slidably supports in an axial bore thereof the plunger 46 which has an enlarged head end 47 engaged by the spring 48 which is coiled about the plunger in the manner shown in FIG. 14. On the side of the bore opposite from the head end 47 the plunger 46 carries an enlarged wedge portion 49. The hook 33 includes a pair of spaced arms 50 through which the eye 51 may freely pass. This eye 51 is pivotally connected at 52 to a bracket 53 which is fixed by any suitable fastener 54 to the paravane 34. The arms 50 pivotally support with the pivot pins 55 which are fixed to the arms 50 a pair of hook members 56 which overlap each other at their free ends extending across the gap between the arms 50 and which pass through the eye 51 so as to connect the paravane 34 with the hook 33. A pair of leaf springs 57 are fixedly carried at their left ends, as viewed in FIG. 14, by the arms 50, respectively, and these leaf springs 57 yieldably maintain the hooks 56 in the position shown in FIG. 14. When the hook 33 and load-line 22 move one with respect to the other for causing the load-line 22 to enter into the space 42, these parts have a momentum which causes the load-line 22 and the head-end 47 of the plunger 46 to engage each other with the result that the plunger 46 is displaced in opposition to the spring 48 to the right, as viewed in FIG. 14, so that the enlarged wedge portion 49 engages the hooks 56 and turns them in opposition to the springs 57 to an open position shown in dot-dash lines in FIG. 14 releasing the eye 51, which now simply falls away from the hook 33 so that in this way the paravane 34 is automatically disconnected from the hook 33 after the latter becomes connected with the load-line 22.

Figures 15, 16:
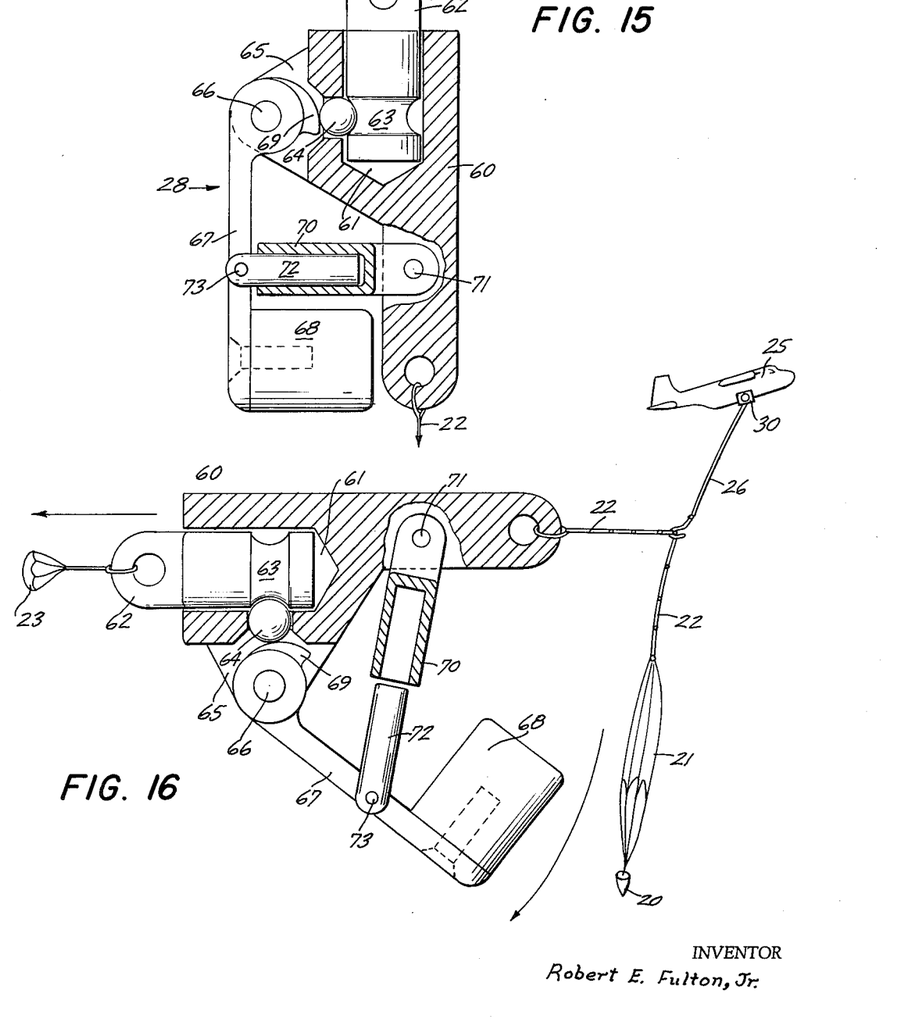
FIG. 15 is partly sectional elevation illustrating the structure for releasably connecting the drogue chute to the load-line.
FIG. 16 shows how the structure of FIG. 15 operates to release in an automatic manner the drogue chute from the load-line.

As has been indicated above, when the lift-line 26 and the load-line 22 are interconnected the drogue chute 23 will be automatically released from the load-line 22 in the manner indicated in FIG. 12 by the device 28, and FIGS. 15 and 16 show the details of the means 28 for automatically releasing the drogue chute 23. The device 28 includes an elongated member 60 formed at one end with a bore 61 and connected at its opposite end to the load-line 22 in the manner indicated in FIGS. 15 and 16. The bore 61 slidably receives the elongated pin 62 which is connected to the drogue chute 23. This pin 62 is formed with an annular groove 63, and a wall of the member 60 is formed with an opening receiving a ball member 64 which is located in the groove 63 so as to retain the pin 62 in the position indicated in FIG. 15.

The member 60 has a pair of walls 65 which carry a pivot pin 66 which extends between the walls 65 and which pivotally support a lever 67 in a manner indicated in FIGS. 15 and 16. The lever 67 has a free end carrying a weight 68 which is fixed to the lever 67 in any suitable manner. The hub of the lever 67 at its portion which surrounds the pivot pin 66 fixedly carries a cam 69 which retains the ball member 64 in the position indicated in FIG. 15 when the lever 67 is in the position shown in FIG. 15.

When the lift-line 26 is connected by the hook 33 to the load-line 22 the part of the load-line 22 which extends above the hook 33 will turn down to a substantially horizontal position as indicated in FIG. 11, and this will cause the weight 68 to act on the lever 67 to turn it in a clockwise direction, as viewed in FIG. 16, and when the lever 67 turns beyond the position indicated in FIG. 16 the ball member 64 will be free to drop away from the groove 63 and thus release the pin 62 from the recess or bore 61 so that in this way the drogue chute 23 is automatically disconnected from the load-line 22.

It is desirable to have a time delay which will permit the pin 62 to be released only after the elongated member 60 remains in a substantially horizontal position for a period of at least a few seconds. For example, it is quite possible that the load-line 22 may strike the line 26 and at that instant the part of the load-line 22 above the line 26 may momentarily swing over to a horizontal position but it would not be desirable to release the drogue chute 23 until the hook 33 is securely connected with the load-line 22, so that under these circumstance it is desirable to permit the chute 23 to remain connected to the load-line 22 so that it can right itself. A time delay is provided by the cylinder and piston means 70, 72. This means includes the cylinder 70 which is pivotally connected at 71 to the member 60 for free turning movement with respect thereto, while the piston 72 is pivotally connected at 73 to the lever 67. Because the piston 72 is located in the cylinder 70 with a fit which permits the air to enter into the cylinder 70 at a controlled relatively slow rate while the piston 72 is retracted from the cylinder 70, this cylinder and piston means 70, 72 acts as a time delay to permit the lever 67 to be turned by the weight 68 to the position indicated in FIG. 16 only after the member 60 has been in a substantially horizontal position for a number of seconds which guarantee that the location of the drogue chute 23 in its horizontal position is not merely momentary.

Figure 17:
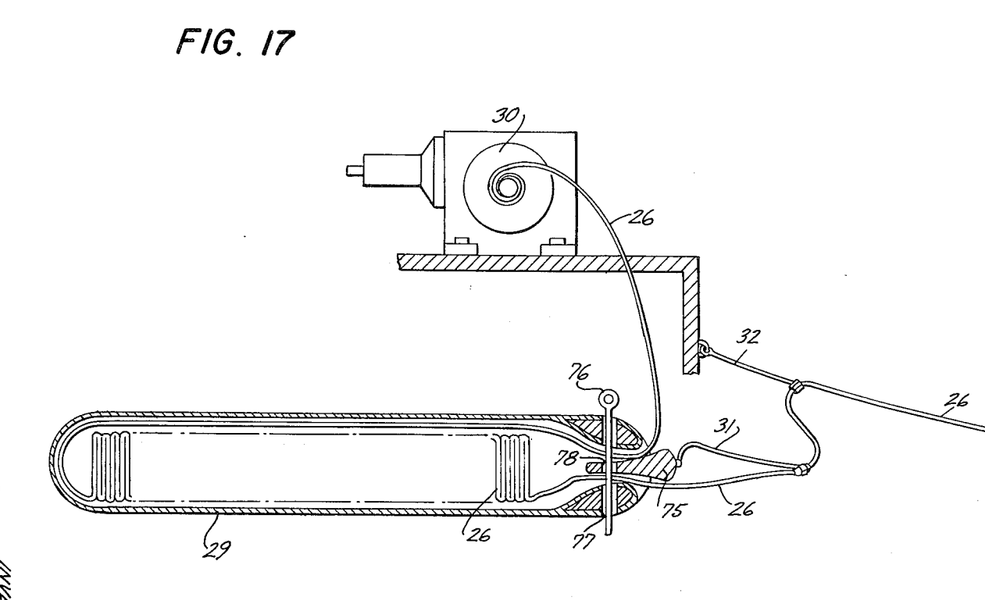
FIG. 17 shows the container from which the lift-line is dispensed as well as the structure associated with this container, FIG. 17 also illustrating diagrammatically the manner in which the lift-line is connected to the winch and the manner in which the lift-line is connected to the aircraft prior to connection of the lift-line with the load-line.

Referring to FIG. 17, the weak cord 32 is shown diagrammatically connected to the fuselage of the aircraft as well as to the lift-line 26, and FIG. 17 also shows the cord 31 which is connected to the plug 75. The lift-line 26 is extremely long and it is simply stuffed in the manner indicated in FIG. 17 into the elongated container 29 in a manner permitting the lift-line 26 to be automatically payed out of the container 29 without snarling. The container 29 has an open right end, as viewed in FIG. 17, and the lift-line 26 extends through this open end of the container 29 to the winch 30 in a manner indicated in FIG. 17. The plug 75 frictionally holds the line 26 in the container 29 in the manner indicated in FIG. 17. The container 29 is formed with a bore 77 extending across its open right end, as viewed in FIG. 17, and the plug 75 is formed with an aligned bore 78, and a pin 76 extends through the bores 77 and 78 in the manner indicated in FIG. 17 in order to guarantee that the plug 75 is not withdrawn during handling of the container 29. When the aircraft is in flight with the paravane 34 maintaining the part of the lift-line 26 which extends from the container 29 trailing and to one side of the aircraft, in the manner indicated in FIG. 10, the pin 76 is removed so that it will not interfere with the automatic withdrawal of the plug 75. When the lift-line 26 becomes connected with the load-line 22 a pull is exerted on the lift-line 26, and this pull snaps the weak cord 32 and thereafter the pull on the lift-line 26 automatically removes the plug 75. This action takes place immediately upon hooking of the lift-line to the load-line so that at that instant the lift-line 26 automatically pays out and the pilot starts to orbit in the manner described above. When all of the lift-line 26 is payed out of the container 29 the lift line simply extends from the winch 30 which is permanently connected with the free end of the lift-line 26 in the manner shown in FIG. 17, so that there is no transferal problem. The aircraft carries a winch-operator in addition to the pilot, and this operator starts the winch to reel in the lift-line 26 as soon as the entire lift-line has been payed out of the container 29. In this way the lines are reeled in so that the load is brought to the aircraft.

Figure 18:
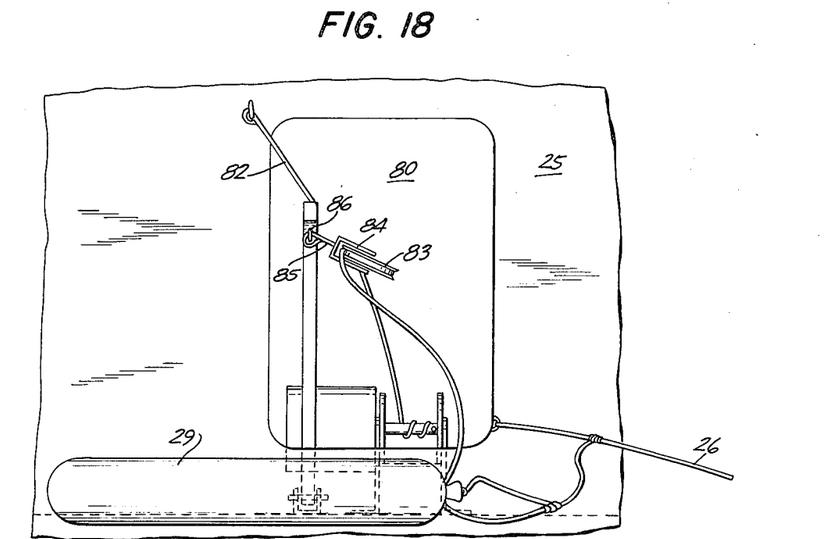
FIG. 18 fragmentarily illustrates part of the aircraft and diagrammatically shows the manner in which the lift-line is guided by a pulley assembly to the winch.
Figure 19:
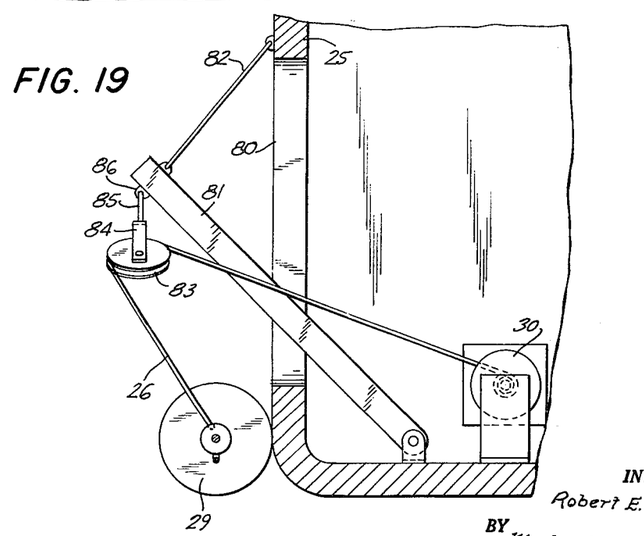
FIG. 19 shows the arrangement of FIG. 18 as it appears from the left of FIG. 18.

Referring to FIGS. 18 and 19, it will be seen that the lift-line 26 is guided from the container 29 over a pulley 83 to the winch 30. This pulley 83 is turnably carried by a U-shaped member 84 fixed to a smaller U-shaped member 85 which passes through a further U-shaped member 86 which is fixed to an elongated arm 81 which is pivotally carried in the interior of the aircraft and which is supported by a linkage 82 so that the arm 81 can be turned through the open side door 80 of the aircraft 25 to the position indicated most clearly in FIG. 18. When the aircraft approaches the load-line the operator of the winch releases the paravane by slowly paying out the part of the line 26 connected thereto. The paravane will now fly and carry the lift-line 26 in a manner trailing and to one side of the aircraft. The release is accomplished slowly so there will be no sudden jerk applied to the lift-line 26 which might break the cord 32, said cord breaking automatically only when the lift-line and the load-line become hooked to each other in the manner described above. The operator of coure easily perceives when all of the lift-line is payed out of the container 29 and when the lift-line becomes tensioned between the pulley 83 and the winch 30 so that the operator can now turn on the winch to reel in the lines, and the lines are reeled in over the pulley 83 located next to the door 80 so that it is a simple matter to bring the load into the aircraft. The door 80 may be open during all of this time, and in fact the door 80 may be in the form of a simple opening in the fuselage without any actual door. Where very high altitude operations are conducted this system permits mounting the line-dispenser tightly against a small hole in the fuselage, the paravane being externally mounted on the aircraft. The hole in the fuselage can be pressure-sealed and thus the lift-line can be payed out without disturbing the internal pressurization of the aircraft. In the final stage of the operation, when the aircraft has descended to a lower altitude the large door or doors can be opened and the load brought aboard.

When the line 26 is entirely payed out and the weight of the load has fully transferred from the parachute to the lift-line, the operator may orally inform the pilot to cease orbiting, or, if desired, the line 26 may pass over a pulley connected to a conventional tensometer which will immediately indicate the increase in tension when all of the line 26 is payed out, and a gauge of the tensometer may be located on the panel in front of the pilot so that the pilot will immediately know from this gauge when to cease orbiting.

The use of two parachutes is not essential. The load-line can extend between the load and a single parachute which is finally disposed of when the pick-up occurs in the same way as the drogue chute described above. Moreover, even a single parachute is not absolutely essential. For example, the load-line may extend between a load connected to one end of the line and a balloon connected to the other end of the line. Any arrangement where a load-line extends from the load may be picked up according to the system of the present invention. For example, the load may be located at the end of a line trailing from one aircraft while a second aircraft directs the lift-line across such a trailing line to become hooked on to the latter, and then the load-line trailing from the aircraft is simply cut so that the load-line may be transferred to the second aircraft. A load on the ground may have a line extending upwardly therefrom, such a line being connected to a balloon, for example, and it is possible to hook the lift-line on to such a load-line also. For example by draping the load-line over the balloon and trailing the paravane-hook below the aircraft it is possible to engage the lift-line and load-lines and accomplish a pickup. Thus, the system of the present invention is extremely flexible and capable of being used under many different types of situations for the purpose of transferring a load to the aircraft provided with the lift-line.

Referring to FIG. 14, the element 43 acts of course as a safety catch preventing separation of the load-line from the lift-line. The hook of FIG. 14 need not necessarily cooperate with the enlargements formed by the plates 37 and 38 shown in FIG. 13. The system, has, in fact, been actually tested where simple knots were tied in the load-lines for engagement in the eye of the hook. However, when heavier loads were transferred, the arrangement shown in FIG. 13 was resorted to.

Thus, with the system of the present invention there are very low acceleration forces, and energy absorption results from the geometry of the system and "sail-effect" on the lift-line and not from a mechanical device. The system of the invention requires very little hardware and the pilot and aircraft are quite safe (there is plenty of room between the aircraft and the drogue-chute). Moreover, there is maximum safety for the load. (If satisfactory contact with the load-line is not accomplished, the load safely continues its descent with its own parachute.) Since the end of the lift-line is permanently attached to the winch, there is no transfer problem, and of course there is a considerable advantage from the capability of locating the winch at the optimum C.G. point. The initial acceleration forces are applied to the aircraft along a line parallel with its longitudinal axis, thus eliminating stability problems and providing maximum maneuverability and performance. There is no speed limit imposed on the aircraft by virtue of the pickup equipment. Thus, the aircraft can proceed at its maximum red-line airspeed to the rendezvous point. The winch and line dispensers can be palletized for rapid aircraft installation, removal and/or replacement. The load-lift-line attaching means is simple and fool-proof. It is conceivably possible to tow the load close to the home base and re-release the load to its own parachute (or to a newly attached chute) if for any reason it becomes impossible to winch the load aboard the aircraft. Inasmuch as virtually all of the pickup gear is aboard the aircraft, the system of the invention requires a minimum of weight to be added to the space vehicle or other device from which the load may be dropped.

It will be understood that each of the elements described above, or two or more together, may also find a useful application in other types of retrieval systems differing from the types described above.

While the invention has been illustrated and described as embodied in an aerial pickup system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essenial characteristics of the generic or specific aspects of this invention and, therefore, such adaptations should and are intended to be comprehended within the meaning and range of equivalence of the following claims.

What is claimed as new and desired to be secured by Letters Patent is:

1. An aerial pickup method comprising the steps of dropping a parachute-supported load with a load-line extending essentially vertically therefrom; connecting to said load-line while the load drops part of a lift-line trailing rearwardly and laterally from an aircraft in flight; paying the remainder of the lift-line out of the aircraft immediately subsequent to connection of the lift-line to the load-line; orbiting around the load-line and a portion of the lift-line connected thereto simultaneously with the paying out of the lift-line from the aircraft; flying along a substantially straight horizontal path after all of the lift-line has been payed out of the aircraft; and bring the lines to the aircraft while the latter flies along the substantially straight horizontal path so as to transfer he load to the aircraft.

2. An aerial pickup method comprising the steps of droping a parachute-supported load with a load-line extending upwardly therefrom and connected at its top end to a drogue chute; flying past said load-line with an aircraft while descending at substantially the same rate as said parachute-supported load and with a lift-line trailing from the aircraft and maintained along a path extending laterally therefrom by a paravane, the paravane holding the free end of the lift-line on the side of the load-line opposite from the aircraft so that when the latter flies past the load-line the load-line will be engaged by the lift-line; connecting the thus-engaged lines to each other; paying out additional lift-line from the aircraft immediately subsequent to connection of the load-line and lift-line to each other and at a rate substantially equal to the speed of travel of the aircraft while simultaneously orbiting the aircraft around the load-line and a portion of the lift-line connected thereto; dropping the drogue chute from the load-line shortly after connection of the lift-line thereto; flying the aircraft along a substantially straight horizontal path after all of the lift-line has been payed out from the aircraft; and winching the lift-line back to the aircraft so as to bring the load-line thereto and thus enable the load to be transferred to the aircraft, all of the above steps being carried out while the aircraft is in flight and while the load is in flight.

3. For use in an aerial pickup system, in combination, a parachute adapted to carry a load; a load-line connected to and extending from the parachute and carrying a plurality of stops distributed along said load-line for cooperating with a hook of a lift-line for connecting the lift-line and load-line to each other; a drogue chute located next to the load-line at its end distant from said parachute; and means connecting said drogue chute to said load-line for automatically releasing said drogue chute from said load-line when the drogue chute assumes a horizontal attitude.

4. For use in an aerial pickup system, a drogue chute; a load-line located adjacent said drogue chute; means releasably interconnecting said drogue chute and load-line for automatically releasing said drogue chute from said load-line when said drogue chute assumes a horizontal attitude while said drogue chute and load-line are in flight; and time-delay means cooperating with said releasable connecting means for preventing the latter from operating to automatically release said drogue chute until said drogue chute has remained in said horizontal attitude for a predetermined length of time.

5. For use in an aerial pickup system, in combination, a drogue chute; a load-line having end located adjacent said drogue chute; a pin fixed to said drogue chute and having a grooved end portion distant from said drogue chute; an elongated connecting member connected to said load-line and formed with a recess receiving said grooved portion of said pin, said connecting member also being formed with an opening communicating with said recess and with said grooved portion of said pin while the latter is in said recess; a ball in said opening and in said grooved portion of said pin; a rotary cam carried by said connecting member and engaging said ball to retain the latter in said grooved portion of said pin when said cam is in a predetermined angular position for preventing said release of said pin from said connecting member while said cam remains in said angular position thereof; and weighted lever means connected to said cam for automatically turning the latter away from said angular position thereof to a position releasing said ball for movement out of said grooved portion of said pin to release the latter from said connecting member when said connecting member and pin extend substantially horizontally, whereby said drogue chute will then be disconnected from said load-line.

6. For use in an aerial pickup system, in combination, a drogue chute; a load-line having end located adjacent said drogue chute; a pin fixed to said drogue chute and having a grooved end portion distant from said drogue chute; an elongated connecting member connected to said load-line and formed with a recess receiving said grooved portion of said pin, said connecting member also being formed with an opening communicating with said recess and with said grooved portion of said pin while the latter is in said recess; a ball in said opening and in said grooved portion of said pin; a rotary cam carried by said connecting member and engaging said ball to retain the latter in said grooved portion of said pin when said cam is in a predetermined angular position for preventing said release of said pin from said connecting member while said cam remains in said angular position thereof; weighted lever means connected to said cam for automatically turning the latter away from said angular position thereof to a position releasing said ball for movement out of said grooved portion of said pin to release the latter from said connecting member when said connecting member and pin extend substantially horizontally, whereby said drogue chute will then be disconnected from said load-line; and cylinder-and-piston means connected to said connecting member and said lever for delaying turning of said weighted lever to release said ball and thus release said pin.

7. For use in an aerial pickup system, in combination, an elongated container having an open end; a lift-line located in said container, adapted to be payed out through said open end thereof, and having a portion extending out through and beyond said open end of said container; a plug located in said open end of said container and frictionally engaging the portion of the load-line extending through and beyond said open end of said container; and means connecting said plug to a portion of said lift-line located outside of said container so that when said portion of said lift-line is pulled the plug will be pulled out of the open end of the container and the lift-line will be payed out through said open end of said container.

8. For use in an aerial pickup system, in combination, a lift-line; a winch connected to one end of said lift-line; a hook connected to the opposite end of said lift-line; a container receiving most of the lift-line between said winch and hook, said container having an open end through which the lift-line extends from said winch into the container and through which the lift-line extends from the container to said hook; a plug extending frictionally into said open end of said container for retaining the lift-line therein; and means connecting said plug to a portion of said lift-line which extends to said hook so that when the latter portion of said lift-line is pulled the plug will be pulled out of the open end of the container and the lift-line can then be payed out therefrom until the lift-line extends from said winch to said hook, so that said winch may then be operated to bring the lift-line back to the winch.

9. For use in an aerial pickup system, in combination, a lift-line; a hook connected to one end of said lift-line; a paravane also connected to said one end of said lift-line; a container in which a long portion of the lift-line is contained; a plug releasably closing said container to retain the long portion of the lift-line therein; means connecting said plug to a portion of the lift-line located outside of said container so that when said portion of said lift-line is pulled the plug will be removed from the container to allow the long portion of the lift-line to be payed out therefrom; and a weak line connected at one end to a portion of the lift-line beyond the container and at its opposite end to a stationary member so that when the hook engages on a load line and the container is carried by an aircraft in flight a pull will be exerted to break said weak line and pull through said connecting means on said plug to remove the latter from the container and thus allow the lift-line to be automatically payed out of said container while the aircraft remains in flight.

10. For use in an aerial pickup system, in combination, a lift-line; a hook connected to one end of said lift-line; a paravane also connected to said one end of said lift-line; a container in which a long portion of the lift-line is contained; a plug releasably closing said container to retain the long portion of the lift-line therein; means connecting said plug to a portion of the lift-line located outside of said container so that when said portion of said lift-line is pulled the plug will be removed from the container to allow the long portion of the lift-line to be payed out therefrom; a weak line connected at one end to a portion of the lift-line beyond the container and at its opposite end to a stationary member so that when the hook engages on a load line and the container is carried by an aircraft in flight a pull will be exerted to break said weak line and pull through said connecting means on said plug to remove the latter from the container and thus allow the lift-line to be automatically payed out of said container while the aircraft remains in flight; and a winch connected to the end of the lift-line opposite from the end which is connected to the hook for reeling in the lift-line after the hook connects the lift-line to a load line.

11. For use in an aerial pickup system, in combination, a load line having a plurality of stops distributed along its length; a lift-line adapted to be placed by an aircraft in a position extending across from the load-line while the latter descends with a load connected thereto; and hook means carried by said lift-line and adapted to be moved thereby into engagement with one of said stops of said load-line to connect the latter to said lift-line, said stops of said load-line each comprising a pair of parallel bars to which portions of the load-line are connected, and a pair of end plates fixed to said bars at the ends thereof and interconnecting said bars with each other, said bars and end plates forming a stop having a size greater than the free space within the hook means so that the load-line can only slip with respect to the hook means until a stop engages the latter.

12. For use in an aerial pickup system, in combination, a hook having a substantially U-shaped portion; a pin having one end in said substantially U-shaped portion and extending slidably through said hook and having a wedge means located beyond said hook; a pair of overlapping levers turnably carried by said hook and adapted to be turned away from each other when said pin is displaced out of the U-shaped portion of the hook by a load-line which enters into said U-shaped portion;

a paravane; and an eye through which said levers extend and connected to said paravane so that the paravane and hook are connected to each other until said pin is displaced out of the U-shaped portion of the hook means to have its wedge means engage said levers to displace the latter from each other and thus release said eye and paravane from said hook.

13. An aerial pickup method comprising the steps of dropping a load supported under at least one parachute by a length of load-line; connecting said load-line to a lift-line trailing by means of an aerial paravane, behind and to the side of an aircraft in flight; orbiting the aircraft around the load while paying out from the aircraft a sufficient size and length of lift-line to generate sufficient sail-effect gradually to absorb the force of accelerating the load to the speed of the aircraft; and winching it aboard.

14. An aerial pickup method comprising the steps of locating a load in the air with a load-line extending in the air upwardly therefrom and connected at its upper end to supporting means adapted to support said load and maintain said load-line in upwardly extending position; flying an aircraft having line engaging means in substantially horizontal direction towards said load-line at a point spaced from said load and said supporting means so as to engage said load-line with said line engaging means intermediate said load and said supporting means; and pulling said line at the point of engagement spaced from said load and said supporting means in a direction transversely of the elongation of said line so that the line will yield in said direction before pulling said load and said supporting means, whereby both said load and said supporting means are carried along by said aircraft first slowly and then with increasing speed.

15. An aerial pickup method comprising the steps of locating a load in the air with a load-line extending in the air upwardly therefrom and connected at its upper end to supporting means adapted to support said load and maintain load-line in upwardly extending position; flying an aircraft having line engaging means in substantially horizontal direction towards said load-line at a point spaced from said load and said supporting means so as to engage said load-line with said line engaging means intermediate said load and said supporting means; pulling said line at the point of engagement spaced from said load and said supporting means in a direction transversely of the elongation of said line so that the line will yield in said direction before pulling said load and said supporting means, whereby both said load and said supporting means are carried along by said aircraft first slowly and then with increasing speed; and bringing the load to the aircraft to transfer said load thereto.

16. An aerial pickup method according to claim 14 wherein a load is dropped with a load-line extending in the air upwardly therefrom and connected at its upper end to supporting means adapted to maintain said load-line in upwardly extending position.

17. An aerial pickup method according to claim 16 wherein said supporting means consists of parachute means.

18. An aerial pickup method according to claim 14 wherein said line engaging means consists of a lift line trailing rearwardly from the aircraft and provided with connecting means at its trailing end adapted to engage said load line.

19. An aerial pickup method according to claim 18 wherein said lift line trailing from said aircraft is maintained in a position extending laterally therefrom.

References Cited by the Examiner

UNITED STATES PATENTS

| Re. 22,351 | 7/43 | Cooper | 258—1.6 |
|---|---|---|---|
| 2,166,575 | 7/39 | Atcherley | 258—1.4 X |
| 2,261,598 | 11/41 | Tyson | 258—1.4 X |
| 2,359,275 | 9/44 | Anderson | 294—83 |
| 2,490,837 | 12/49 | Scott, Jr. | |
| 2,942,815 | 6/60 | Gross et al. | 244—137 |
| 3,061,355 | 10/62 | Cozzoli | 258—1.2 X |

FOREIGN PATENTS 475,920  11/52  Italy.

OTHER REFERENCES

Aviation Week, June 3,1960, No. 24, vol. 72, p. 104. (A copy may be found in Class 244—137, Group 450.)

LOUIS J. DEMBO, *Primary Examiner.*